US007729271B2

(12) United States Patent
Tsuchiya et al.

(10) Patent No.: US 7,729,271 B2
(45) Date of Patent: Jun. 1, 2010

(54) DETECTION METHOD FOR ABNORMAL TRAFFIC AND PACKET RELAY APPARATUS

(75) Inventors: Kazuaki Tsuchiya, Ebina (JP); Hiroshi Sato, Ebina (JP)

(73) Assignee: Alaxala Networks Corporation, Kawasaki (JP)

( * ) Notice: Subject to any disclaimer, the term of this patent is extended or adjusted under 35 U.S.C. 154(b) by 604 days.

(21) Appl. No.: 11/365,500

(22) Filed: Mar. 2, 2006

(65) Prior Publication Data

US 2007/0115850 A1    May 24, 2007

(30) Foreign Application Priority Data

Oct. 20, 2005    (JP) .............................. 2005-305443

(51) Int. Cl.
*H04J 1/16* (2006.01)
*H04L 12/28* (2006.01)

(52) U.S. Cl. ....................... 370/252; 370/392

(58) Field of Classification Search ................. 370/235, 370/252–254, 389, 392, 400, 401
See application file for complete search history.

(56) References Cited

U.S. PATENT DOCUMENTS

| 2002/0031134 | A1* | 3/2002 | Poletto et al. ............... 370/401 |
| 2002/0032793 | A1* | 3/2002 | Malan et al. ................. 709/232 |
| 2002/0035628 | A1* | 3/2002 | Gil et al. ..................... 709/224 |
| 2002/0095492 | A1* | 7/2002 | Kaashoek et al. ........... 709/224 |
| 2005/0010817 | A1* | 1/2005 | Jakubik et al. .............. 713/201 |
| 2005/0013300 | A1  | 1/2005 | Akahane et al. |
| 2005/0213504 | A1* | 9/2005 | Enomoto et al. ............ 370/235 |
| 2005/0276230 | A1* | 12/2005 | Akahane et al. ............. 370/252 |
| 2006/0233101 | A1* | 10/2006 | Luft et al. ................... 370/229 |
| 2006/0282892 | A1* | 12/2006 | Jonnala et al. ................ 726/23 |
| 2007/0041331 | A1* | 2/2007 | Ma et al. ..................... 370/252 |

FOREIGN PATENT DOCUMENTS

| JP | 2002-118556 | 4/2002 |
| JP | 2002-118557 | 4/2002 |
| JP | 2005-051736 | 2/2005 |
| JP | 2005-277804 | 10/2005 |

OTHER PUBLICATIONS

Rtc3954, B. Claise, "Cisco Systems NetFlow Services Export Version 9,", online, Oct. 2004, IETF.

* cited by examiner

*Primary Examiner*—Hong Cho
(74) *Attorney, Agent, or Firm*—Brundidge & Stanger, P.C.

(57) ABSTRACT

The present invention provides a technology including, for example, a packet relay processing section to carry out packet relay, a packet sampling section to carry out packet sampling, a flow statistics counting section to take statistics of each flow, and a flow statistics generating section to generate a NetFlow export datagram, wherein the flow statistics counting section collectively counts the number of the packets or bytes received per unit time when the number does not exceed a threshold value and individually counts the number for each flow when the number exceeds the threshold value, and thereby a flow of abnormal traffic which is suspected to be DoS attack is efficiently detected with small amounts of resources (mainly memories).

10 Claims, 6 Drawing Sheets

FIG. 4

| FLOW STATISTICS TABLE | | CONTENTS OF ENTRY | |
|---|---|---|---|
| ENTRY A | ~150 | SOURCE IP ADDRESS | ~151 |
| ENTRY B | ~150 | DESTINATION IP ADDRESS | ~152 |
| ENTRY C | | NEXT-HOP IP ADDRESS | ~153 |
| ENTRY D | | SNMP INDEX NUMBER OF INPUT INTERFACE | ~154 |
| ENTRY E | | SNMP INDEX NUMBER OF OUTPUT INTERFACE | ~155 |
| ENTRY F | | TOTAL NUMBER OF L3 PACKET OF FLOW | ~156 |
| RESERVED (UNALLOCATED) | | TOTAL BYTE NUMBER OF L3 PACKET OF FLOW | ~157 |
| RESERVED (UNALLOCATED) | | SysUptime AT TIME OF RECEPTION OF FLOW START PACKET (SEC.) | ~158 |
| ... | | SysUptime AT TIME OF RECEPTION OF FLOW FINISH PACKET (SEC.) | ~159 |
| RESERVED (UNALLOCATED) | | TCP SOURCE PORT NUMBER | ~160 |
| RESERVED (UNALLOCATED) | | TCP DESTINATION PORT NUMBER | ~161 |
| RESERVED (UNALLOCATED) | | PAD (ONE BYTE) | ~162 |
| RESERVED (UNALLOCATED) | | ACCUMULATION OF TCP FLAG | ~163 |
| RESERVED (UNALLOCATED) | | IP UPPER LEVEL PROTOCOL NUMBER | ~164 |
| RESERVED (UNALLOCATED) | | IP TOS | ~165 |
| RESERVED (UNALLOCATED) | | AS NUMBER OF ANY OF SOURCE ADJACENT VIAS | ~166 |
| RESERVED (UNALLOCATED) | | AS NUMBER OF ANY OF DESTINATION ADJACENT VIAS | ~167 |
| RESERVED (UNALLOCATED) | | PREFIX MASK BIT NUMBER OF SOURCE IP ADDRESS | ~168 |
| ENTRY Z | | PREFIX MASK BIT NUMBER OF DESTINATION IP ADDRESS | ~169 |

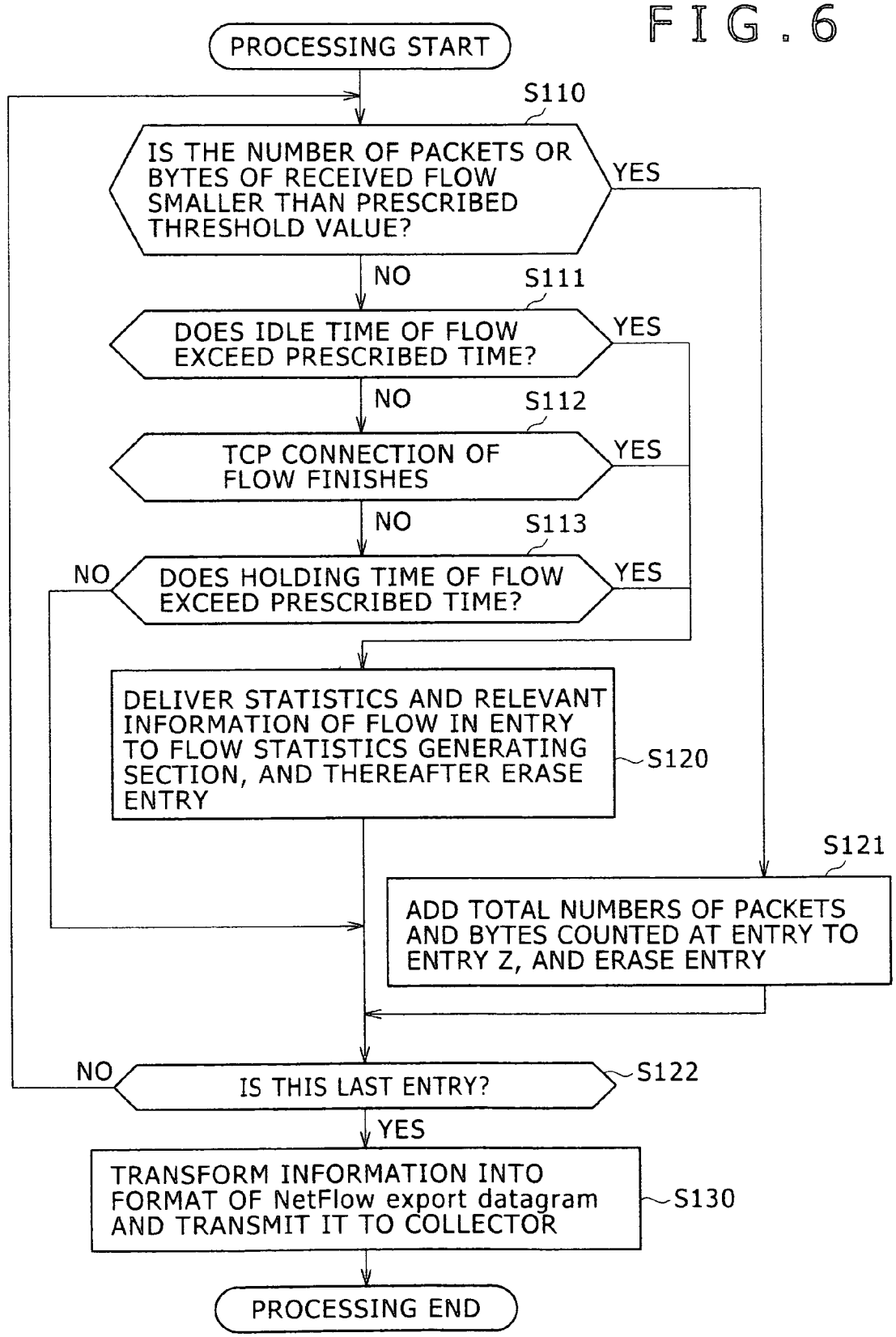

DETECTION METHOD FOR ABNORMAL TRAFFIC AND PACKET RELAY APPARATUS

CLAIM OF PRIORITY

The present application claims priority from Japanese application JP2005-305443 filed on Oct. 20, 2005, the content of which is hereby incorporated by reference into this application.

BACKGROUND OF THE INVENTION

The technical field of the present invention relates to a detection method for abnormal traffic which has the possibility of DoS (Denial of Service) attack in a network, and a packet relay apparatus which is used for the method.

A typical example of DoS attack is that an attacker launches a very large amount of access on a target via a network, thereby makes the resources (memories, CPU power, etc.) of the target consumed, and prevents originally intended services from being carried out. The targets of the attack are networks and apparatuses which are connected to networks and provide various services (servers, packet relay apparatuses (routers, switches), etc.).

As a technology of detecting DoS attack, there is a flow monitoring technology which is known under the name of NetFlow. The NetFlow is stipulated in Non-patent Reference 1. In the NetFlow, when a packet relay apparatus receives packets, packets are sampled at a rate of 1/n (at a rate of one packet to n packets) and the number of packets and the number of bytes are statistically counted for a series of packets (referred to as "flow") which have identical values in seven information items ((1) a source IP address, (2) a destination IP address, (3) an IP upper level protocol number, (4) a TCP (or UDP) source port number, (5) a TCP (or UDP) destination port number, (6) an IPTOS (FlowLabel in the IPv6), and (7) an SNMP index number of an input interface). The packet relay apparatus transforms the statistics and relevant information of the flow into the format of a NetFlow export datagram (described in Non-patent Reference 1) and transmits the datagram to an external server called a collector when one of the following conditions is satisfied.

The conditions are: (1) the idle time of a flow exceeds a predetermined time; (2) the TCP connection of a flow terminates (at the time of the reception of the packet of FIN=ON or RST=ON in the TCP); and (3) the holding time of a flow exceeds a predetermined time. A collector detects a flow having outstandingly large numbers of packets and bytes (a flow suspected to be DoS attack) by analyzing the statistics and relevant information.

[Non-patent Reference 1]

IETF RFC3954 (B. Claise, "Cisco Systems NetFlow Services Export Version 9," [online], October 2004, IETF, [searched on Aug. 22, 2005], Internet <URL:http://www.ietf.org/rfc/rfc3954.txt?number=3954>)

SUMMARY OF THE INVENTION

A packet relay apparatus transmits the statistics and relevant information of a flow to a collector when one of the aforementioned conditions is satisfied. However, very large amounts of resources (mostly memories) must be prepared for the packet relay apparatus in order to gather statistics for each flow during the processes. Nevertheless, the statistical values (the number of packets and the number of bytes) of most flows flowing in a network are small and those are the information which is scarcely used for the analysis of DoS attack. For that reason, it is a common practice that, even though the collector individually reveals flows of large statistical values (for example, top ten flows), it regards the other flows collectively as "others" or does not reveal them.

Further, a packet relay apparatus transmits the statistics and relevant information of a flow to a collector when an aforementioned condition is satisfied. However, by the method, the collector can detect a flow having outstandingly large numbers of packets and bytes (abnormal traffic, namely a flow suspected to be DoS attack) only after the termination of the flow.

In view of the above situation, the present inventers have studied: a detection method for abnormal traffic which can efficiently detect, with small amounts of resources, the flows of DoS attack wherein an attacker launches a very large amount of access on a target via a network, thereby makes the resources of the target consumed, and prevents originally intended services from being carried out; and a packet relay apparatus which is used for the detection method.

For example, a technology is provided, which technology is a method for efficiently detecting a flow of abnormal traffic, wherein, with regard to the packets sampled at a rate of 1/n when a packet relay apparatus receives packets, (a) in the case where the number of the packets or bytes of flows received per unit time exceeds a predetermined threshold value, the numbers of the packets and bytes of each flow are statistically counted, and in any of the case where an idle time exceeds a predetermined time, the case where TCP connection is terminated, and the case where a holding time exceeds a predetermined time, the statistics and relevant information of the relevant flow are transformed into the format of a NetFlow export datagram and sent to a collector, and (b) in the case where the number of the packets or bytes of flows received per unit time does not exceed the threshold value, the flows are regarded collectively as other flows, the numbers of the packets and bytes are statistically counted, the statistics are transformed into the format of a NetFlow export datagram as the statistics of the other flows, and the statistics are sent to a collector at regular intervals.

By the aforementioned detection method for abnormal traffic, in the case where the number of the packets or bytes of flows received per unit time does not exceed a threshold value, the numbers of the packets and the bytes are counted collectively as other flows by a packet relay apparatus, and thereby it is not necessary to prepare very large amounts of resources in order to take the statistics of most flows (having small statistical values) flowing in a network. In contrast, in the case where the number of the packets or bytes of flows received per unit time exceeds a threshold value, the numbers are counted for each flow and sent to a collector, and thereby it is possible to efficiently detect abnormal traffic with small amounts of resources.

Further, instead of a method of determining whether the numbers are counted for each flow or other flows on the basis of whether or not the number of the packets or bytes of flows received per unit time exceeds a threshold value, a method of determining whether the numbers are counted for each flow or other flows on the basis of whether or not the peak rate of the number of the packets or bytes of a flow exceeds a threshold value can also be considered. By this detection method for abnormal traffic, it is also possible to detect DoS attack which occurs instantaneously.

BRIEF DESCRIPTION OF THE DRAWINGS

FIG. 4 is a chart showing an example of the configuration of a flow statistics table;

FIG. 6 is a flowchart showing an example of the operations of a packet relay apparatus in transmitting the statistics and relevant information of a flow to a collector.

DESCRIPTION OF THE EMBODIMENTS

Embodiments suitable for the present invention are hereunder explained with examples in reference to drawings. Note that the present invention is not limited to the embodiments. For example, although the version of an internet protocol is explained on the basis of the IPv4 and an upper level protocol is explained on the basis of the TCP, the present invention is not limited to those cases.

Figure 1:
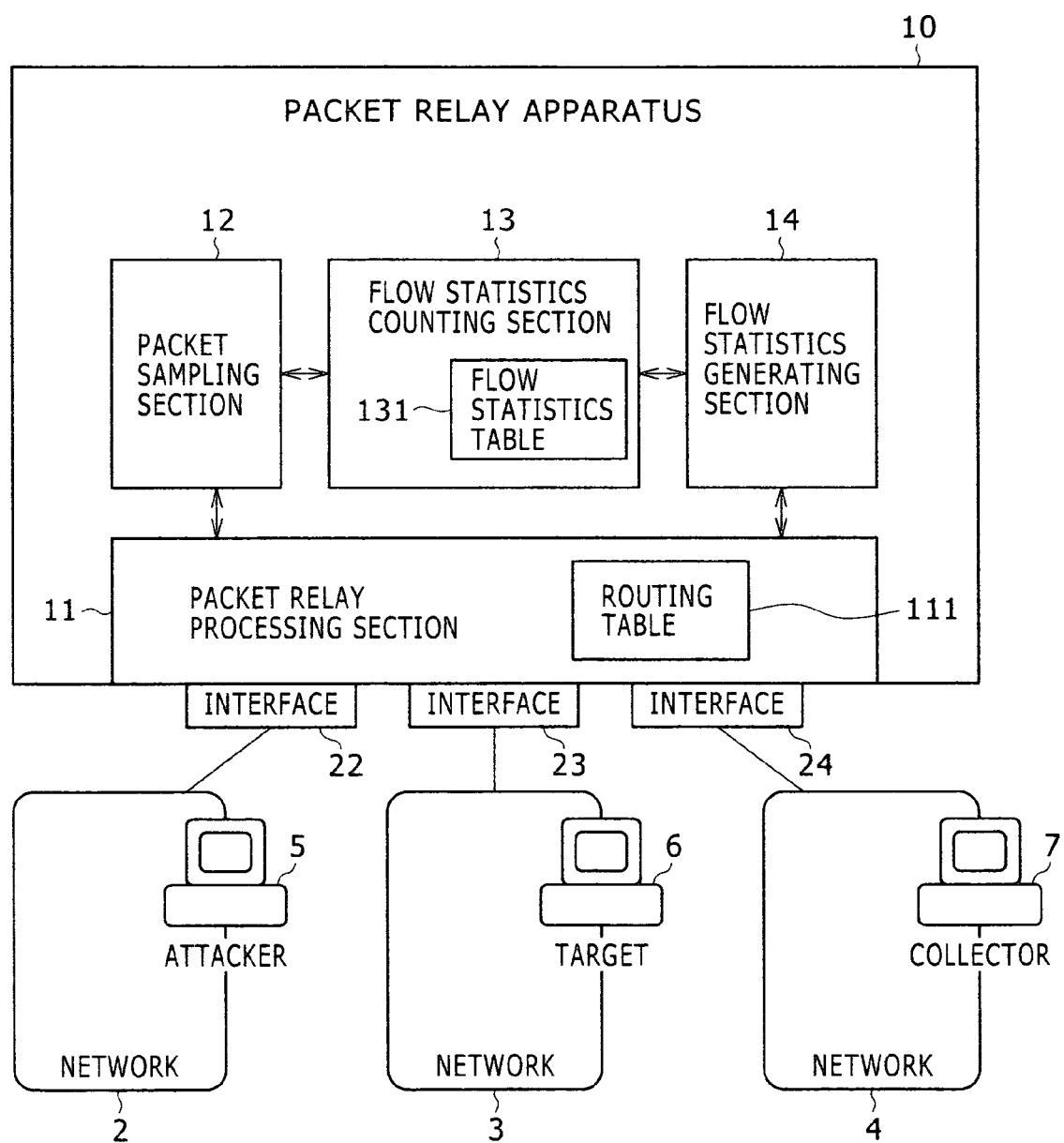
FIG. 1 is a block diagram showing an example of the configuration of a network.

FIG. 1 is a block diagram of a network. In FIG. 1, a network 100 includes networks 2 to 4 and a packet relay apparatus 10 which relays packets between the networks 2 to 4. Here, a terminal 5 of an attacker exists in the network 2. Further, a sever 6 which is a target of the attacker exists in the network 3 and a collector 7 (a statistics information analysis server) exists in the network 4.

The packet relay apparatus 10 includes a packet relay processing section 11, a packet sampling section 12, a flow statistics counting section 13, a flow statistics generating section 14, and plural interfaces 22 to 24. Each of the packet relay processing section 11, the packet sampling section 12, the flow statistics counting section 13, and the flow statistics generating section 14 includes electronic devices such as CPUs, ASICs, RAMs, ROMs and others.

The packet relay processing section 11 is a unit which carries out route control processing, forms a routing table 111, and relays packets between the networks 2 to 4 on the basis of the routing table 111. The packet sampling section 12 samples packets at a rate of 1/n from the packets which the packet relay processing section 11 has received from the networks 2 to 4, and copies and delivers the sampled packets to the flow statistics counting section 13. Here, n is a positive integer and can take a very large numerical value including 1 in accordance with the size of networks.

The flow statistics counting section 13 counts (tallies) the numbers of packets and bytes for a series of packets (a flow) having identical values in the seven information items ((1) a source IP address, (2) a destination IP address, (3) an IP upper level protocol number, (4) a TCP source port number, (5) a TCP destination port number, (6) an IP TOS, and (7) an SNMP index number of an input interface) out of the packets received from the packet sampling section 12, and tallies up the counted numbers on a flow statistics table 131. The flow statistics counting section 13 delivers the statistics and relevant information of a flow (information which will be sent as a NetFlow export datagram and retained in the routing table 111, the flow statistics table 131 and others in the packet relay apparatus 10) to the flow statistics generating section 14 when one of the conditions described below is satisfied. Here, the conditions on which the flow statistics counting section 13 delivers the statistics and relevant information of a flow to the flow statistics generating section 14 are as follows: (1) the idle time of a flow exceeds a predetermined time; (2) the TCP connection of a flow terminates; and (3) the holding time of a flow exceeds a predetermined time.

The flow statistics generating section 14 transforms the statistics and relevant information of a flow delivered from the flow statistics counting section 13 into the format of a NetFlow export datagram, and delivers it by instructing the packet relay processing section 11 to transmit it to the collector 7. The packet relay processing section 11 transmits the NetFlow export datagram to the collector 7 in the network 4.

Figure 2:
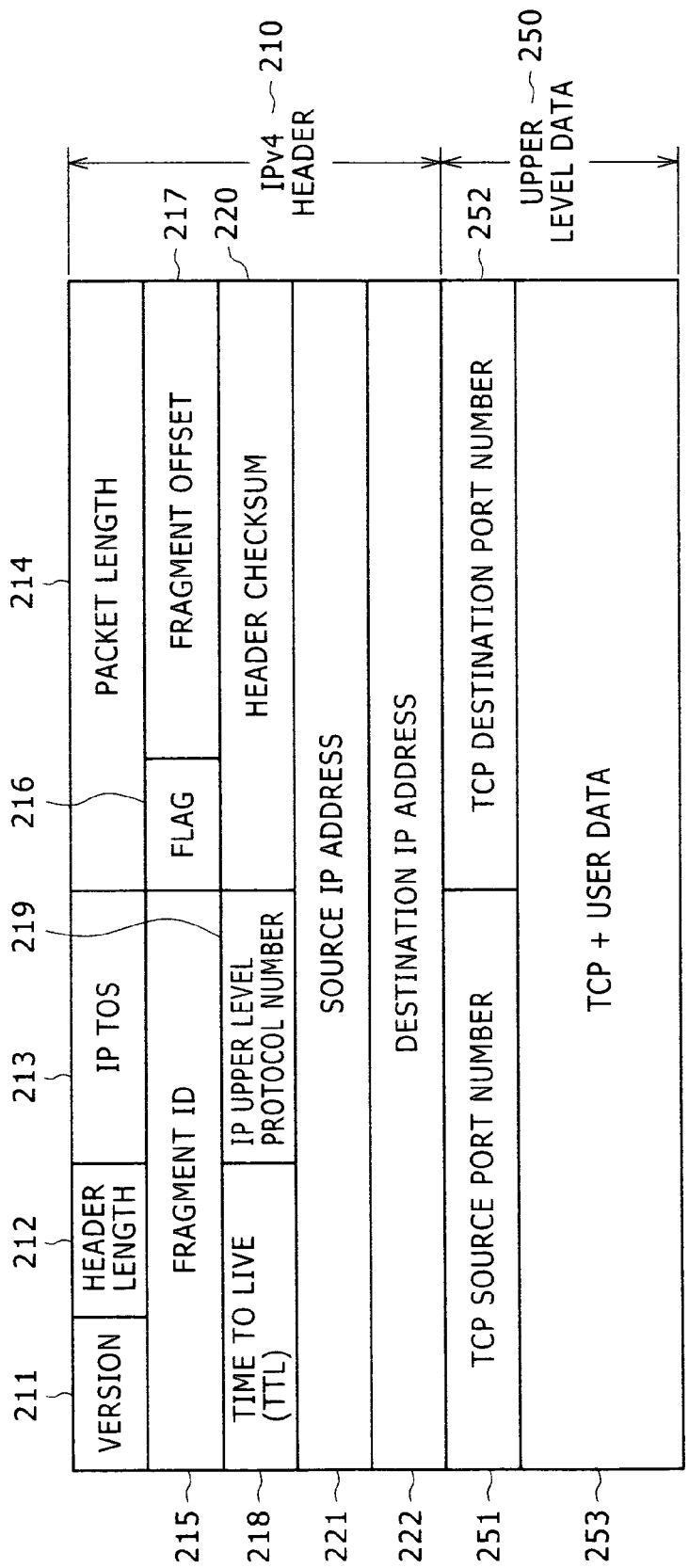
FIG. 2 is a chart explaining an example of an IP datagram format of the IPv4.

FIG. 2 is a chart explaining an IP datagram format of the IPv4. In FIG. 2, an IP datagram format 200 is composed of an IPv4 header 210 and upper level data 250. Further, the IPv4 header 210 is composed of a version 211, a header length 212, an IP TOS 213, a packet length 214, a fragment ID 215, a flag 216, a fragment offset 217, Time To Live (TTL) 218, an IP upper level protocol number 219, a header checksum 220, a source IP address 221, and a destination IP address 222. Furthermore, the upper level data 250 is composed of: a TCP source port number 251 and a TCP destination port number 252 which are parts of the TCP header; and TCP+ user data 253 which are TCP data and user data. In this case, the numeral "4" is put into the version 211 since the IPv4 is adopted, the numeral "5" is put into the header length 212, and the numeral "6" is put into the upper level protocol number 219 since the TCP is adopted.

The (1) source IP address with which the flow statistics counting section 13 defines a flow is the source IP address 221. Likewise, the (2) destination IP address is the destination IP address 222. The (3) IP upper level protocol number is the IP upper level protocol number 219. The (4) TCP source port number is the TCP source port number 251. The (5) TCP destination port number is the TCP destination port number 252. Further, the (6) IP TOS is the IP TOS 213. Meanwhile, the (7) SNMP index number of an input interface is a physical interface number.

Figure 3:
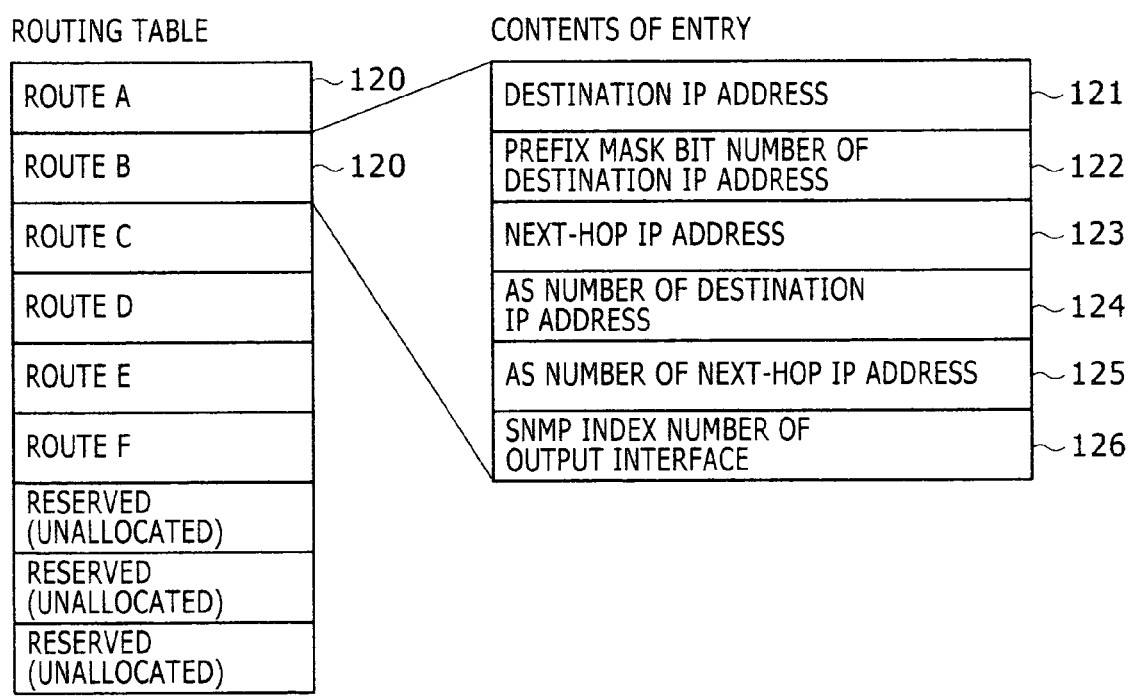
FIG. 3 is a chart showing an example of the configuration of a routing table.

FIG. 3 is a configuration chart of a routing table. A routing table 111 is the table which retains the relationship between an IP address and information on an output network (the SNMP index number of an output interface, a next-hop IP address and others) which are obtained through routing control processing. The routing table 111 includes an electronic device such as a CAM (Content Addressable Memory), a RAM or the like which has a survey function of adopting comparative logic with a key among stored data when the key is given to a memory and putting a flag onto a data address conforming to associative conditions.

In FIG. 3, the routing table 111 includes plural route information items 120. The entry of each of the route information items 120 includes a destination IP address 121, the prefix mask bit number of the destination IP address 122, a next-hop IP address 123, the AS number of the destination IP address 124, the AS number of the next-hop IP address 125, and the SNMP index number of an output interface 126.

FIG. 4 is a configuration chart of a flow statistics table. A flow statistics table 131 is the table which retains the seven information items to distinguish a flow, the counted numbers of packets and bytes, and the relevant information of the relevant flow, and includes an electronic device such as a CAM, a RAM or the like.

In FIG. 4, the flow statistics table 131 includes plural entries 150 which are the statistical data of plural flows. Each of the entries 150 includes a source IP address 151, a destination IP address 152, a next-hop IP address 153, the SNMP index number of an input interface 154, the SNMP index number of an output interface 155, the total number of L3 packets of a flow 156, the total byte number of L3 packets of a flow 157, the SysUptime at the time of the reception of a flow start packet 158, the SysUptime at the time of the reception of a flow finish packet 159, a TCP source port number 160, a TCP destination port number 161, a PAD 162, accumulation of TCP flags 163, an IP upper level protocol number 164, an IP TOS 165, the AS number of any of source adjacent vias 166, the AS number of any of destination adjacent vias 167, the prefix mask bit number of the source IP address 168, and the prefix mask bit number of the destination IP address 169.

The (1) source IP address with which the flow statistics counting section 13 determines a flow is the source IP address 151. Likewise, the (2) destination IP address is the destination IP address 152. The (3) IP upper level protocol number is the IP upper level protocol number 164. The (4) TCP source port number is the TCP source port number 160. The (5) TCP destination port number is the TCP destination port number 161. Further, the (6) IP TOS is the IP TOS 165. The (7) SNMP index number of an input interface is the SNMP index number of an input interface 154.

Here, the last entry (refereed to as "entry Z") of the flow statistics table 131 is used for the counting (recounting) of the numbers of the packets and bytes of a flow which is judged to be unnecessary for the counting as an individual flow. That is, in this case, the information on an individual flow has no meaning. Hence, "0's (zeros)" are set at the seven information items.

Figure 5:
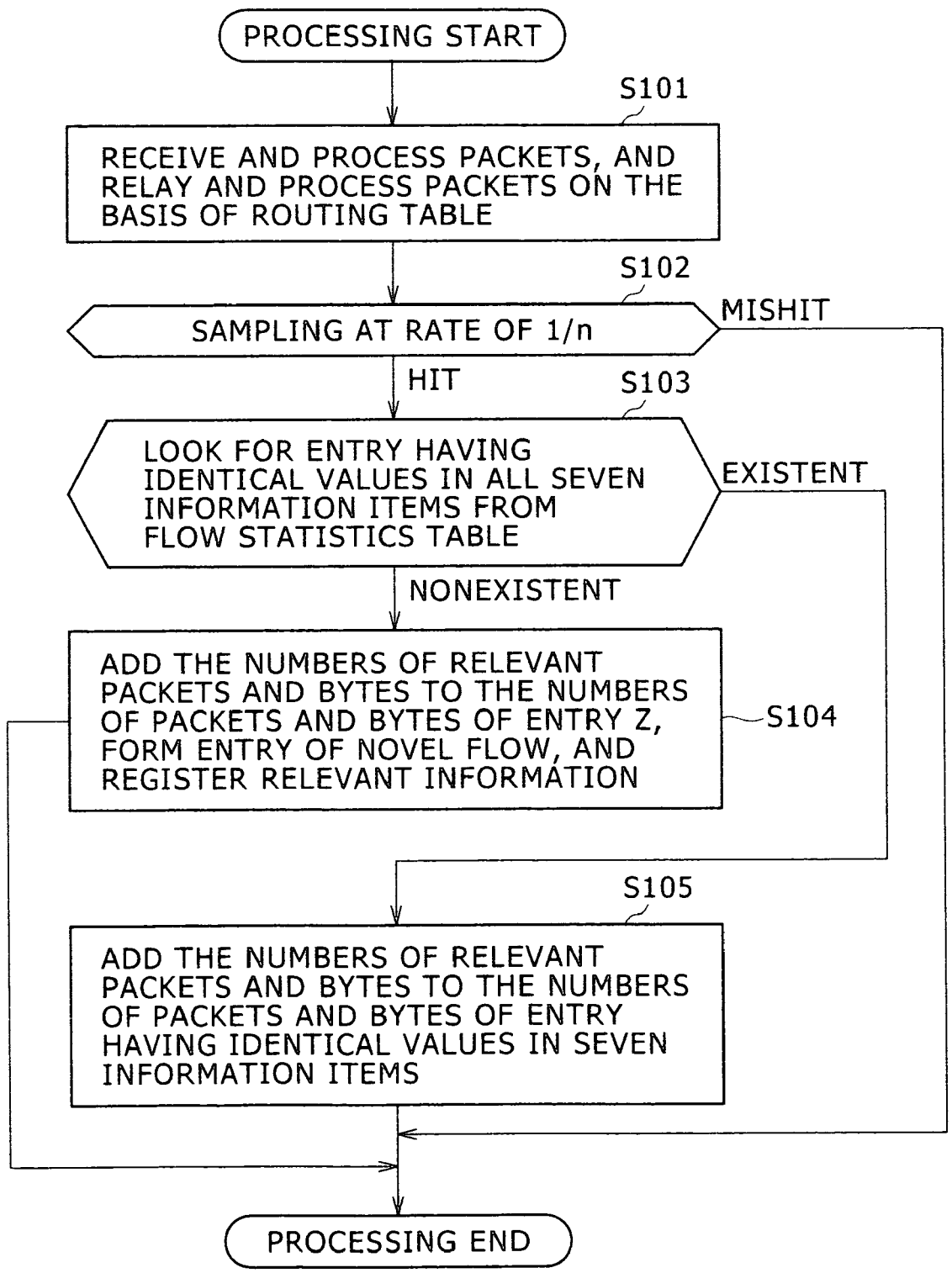
FIG. 5 is a flowchart showing an example of the operations of a packet relay apparatus in counting the numbers of packets and bytes for each flow.

FIG. 5 is a flowchart showing the operations of a packet relay apparatus in counting the numbers of packets and bytes for each flow. First, explanations are given to the operations of the packet relay apparatus 10 when it receives the packets of a new flow (referred to as "flow A"). The relay processing section 11 receives and processes the packets of the flow A and relays and processes the packets on the basis of the routing table 111 (S101). The packet sampling section 12 samples the packets which are relayed and processed in the packet relay processing section 11 at a rate of 1/n (S102), and, when packets are sampled, the sampled packets are copied and delivered to the flow statistics counting section 13. Here, when packets are not sampled, no action is taken and the processing is terminated.

The flow statistics counting section 13, with regard to the packets delivered from the packet sampling section 12, searches for entries, which have identical values in the seven information items ((1) a source IP address, (2) a destination IP address, (3) an IP upper level protocol number, (4) a TCP (UDP) source port number, (5) a TCP (UDP) destination port number, (6) an IP TOS (FlowLabel in the case of the IPv6), and (7) an SNMP index number of an input interface), out of the flow statistics table 131 (S103). In this case, since the flow is a new flow and thus has no identical entries, the flow statistics counting section 13 adds the numbers of the packets and bytes of the relevant packets to the numbers of the packets and bytes of the entry Z, newly forms an entry for the flow A (referred to as "entry A", and resisters the relevant information. Here, the numbers of the packets and bytes of the entry A are set at "0's" (S104). The purpose thereof is to avoid double counting.

Next, explanations are given to the operations of the packet relay apparatus 10 when it receives the packets of the flow A again after the receipt of a flow A. The relay processing section 11 receives and processes the succeeding packets of the flow A and relays and processes the packets on the basis of the routing table 111 (S101). The packet sampling section 12 samples the packets which are relayed and processed in the packet relay processing section 11 at a rate of 1/n (S102), and, when packets are sampled, the sampled packets are copied and delivered to the flow statistics counting section 13. Here, when packets are not sampled, no action is taken and the succeeding processing is not carried out. The flow statistics counting section 13, with regard to the packets delivered from the packet sampling section 12, searches for entries, which have identical values in all the seven information items, out of the flow statistics table 131 (S103). In this case, since the packets are known packets, the flow statistics counting section 13 detects the entry A and adds the numbers of the packets and bytes of the relevant packets to the numbers of the packets and bytes of the entry A (S105). Through the above procedure, it is possible to detect a novel flow and count (tally) the numbers of the packets and bytes of each flow.

FIG. 6 is a flowchart showing the operations of a packet relay apparatus in transmitting the statistics and relevant information of a flow to a collector. With FIG. 6, explanations are given of the operations of the packet relay apparatus 10 when the statistics and relevant information of a flow are transmitted to the collector 7.

The flow statistics counting section 13 searches for the flow statistics table 131 at regular intervals, looks for an entry conforming to any of the four conditions, and carries out processing corresponding to each condition. First, it is judged whether or not the entry is categorized into the case where the total number of the packets of flows received per unit time is smaller than a predetermined threshold packet number or whether or not the entry is categorized into the case where the total number of the received bytes is smaller than a predetermined threshold byte number (S110). If the judgment says yes, the counted total numbers of packets and bytes are added (recounted) to the entry Z and the entry is erased (S121). Whether or not the entry is the last entry is judged (S122) and, if the judgment says yes, the information is transformed into the format of a NetFlow export datagram and it is transmitted to the collector 7 (S130). If the judgment says no in the step 122, the procedure goes back to the step 110 and processing is applied to the next entry.

If the judgment says no in the step 110, whether or not the idle time of the flow exceeds a predetermined time is judged (S111) and, if the judgment says yes, the statistics and relevant information of the flow are delivered to the flow statistics generating section (S120) and the procedure moves to the step 122. If the judgment says no in the step 111, whether or not the TCP connection of the flow is terminated is judged (S112). In the step 112, more specifically, whether or not FIN=ON or RST=ON in the TCP is judged and, if the judgment says yes, the procedure goes to the step 120 and, if no, it goes to the step 113. In the step 113, it is judged whether or not the holding time of the flow exceeds a predetermined time. If the judgment says yes in the step 113, the procedure goes to the step 120 and, if no, it goes to the step 122.

The judgment in the step 110 is carried out by determining whether or not the following expression (1) or (2) is satisfied;

Total packet number/(Flow reception finish time−Flow reception start time)<Threshold value    (1), Total byte number/(Flow reception finish time−Flow reception start time)<Threshold value    (2).

The judgment in the step 111 is carried out by determining whether or not the following expression (3) is satisfied;

Present time−Flow reception finish time≧Predetermined time (3).

The judgment in the step 113 is carried out by determining whether or not the following expression (4) is satisfied;

Present time−Flow reception start time≧Predetermined time (4).

The collector 7 analyzes the NetFlow export datagram and detects a flow having outstandingly large numbers of packets and bytes (a flow suspected to be DoS attack).

According to the present embodiment, when the number of the packets or bytes of flows received per unit time does not exceed a threshold value, the packet relay apparatus 10 counts the number collectively in the entry Z and, when the number of the packets or bytes of flows received per unit time exceeds the threshold value, the number is counted for each flow and sent to the collector 7. Hence, it is possible to efficiently detect a flow having outstandingly large numbers of packets and bytes with small amounts of resources.

Note that, although a series of packets having identical values in all the seven information items are defined as a flow and the numbers of packets and bytes are statistically counted for each flow in the aforementioned embodiment, the seven information items are not essential factors. It is also acceptable to define a series of packets having identical values in a source IP address and a destination IP address as a flow and statistically count the numbers of packets and bytes for each flow. Further, not limited to the IPv4, but the IPv6 may also be adopted. In the case of the IPv6, the IP TOS in the aforementioned embodiment may be interpreted as the FlowLabel. Furthermore, although the TCP is explained as the upper level protocol, the ICMP or the UDP is acceptable and moreover the upper level protocol is not limited to those. When the upper level protocol is the UDP, the TCP source and destination port numbers in the aforementioned embodiment may be interpreted as the UDP source and destination port numbers, respectively. The same is true in the case of another upper level protocol. Further, if a corresponding concept does not exist, a constant value may be applied to all flows.

In the aforementioned embodiment, the flow statistics counting section 13 detects an entry wherein the number of the packets or bytes of flows received per unit time is smaller than a predetermined threshold value (a lower limit, adds the counted numbers of the packets and bytes to the entry Z, and erases the entry. However, it is also acceptable to set another threshold value (an upper limit), and when the number of the packets or bytes of flows received per unit time exceeds the threshold value (the upper limit), deliver the statistics and relevant information of the relevant entry to the flow statistics generating section 14 and transmit them to the collector 7. In this case, it is also acceptable to deliver an SNMP Trap packet (SNMP: Simple Network Management Protocol) showing that the number of the packets or bytes of flows received per unit time exceeds the threshold value (the upper limit), and thereby instantaneously notify a network administrator of the occurrence of abnormality.

Further, the threshold value (the upper limit) may also be plural values. For example, it is also acceptable to set a level one (low) threshold value and a level two (high) threshold value, and when the level one (low) threshold value is exceeded, transform the relevant flow into a NetFlow export datagram and deliver the datagram to the collector 7, and when the level two (high) threshold value is exceeded, further deliver an SNMP Trap packet. Furthermore, it is also acceptable, in the case of an entry wherein the number of the packets or bytes of flows received per unit time is less than an upper rank n (n is a positive integer), to add the counted byte number to the entry Z and erase the entry.

Through the above procedures, it is possible for the controller 7 to detect a flow having outstandingly large numbers of packets and bytes at an early stage. Note that the flow statistics counting section 13 erases an entry after it delivers the statistics and relevant information of the entry to the flow statistics generating section 14.

Further, in the aforementioned embodiment, the flow statistics counting section 13 detects an entry wherein the holding time of a flow exceeds a predetermined time, delivers the statistics and relevant information of the entry to the flow statistics generating section 14, and transmits them to the collector 7. However, it is also acceptable to detect an entry wherein the number of the packets or bytes of a flow exceeds a predetermined threshold value, deliver the statistics and relevant information of the entry to the flow statistics generating section 14, and transmit them to the collector 7. By so doing, it is possible for the collector 7 to detect a flow having outstandingly large numbers of packets and bytes at an early stage. Note that the flow statistics counting section 13 erases an entry after it delivers the statistics and relevant information of the entry to the flow statistics generating section 14.

Further, in the aforementioned embodiment, the flow statistics counting section 13 sets the numbers of the packets and bytes of the entry of a novel flow at "0's" and adds the numbers of the relevant packets to the numbers of the packets and bytes of the entry Z. However, it is also acceptable to add the numbers of the relevant packets to the numbers of the packets and bytes of the entry of a novel flow. By so doing, it is possible for the controller 7 to more precisely grasp the numbers of the packets and bytes of the flow having outstandingly large numbers of packets and bytes.

In the aforementioned embodiment, the flow statistics counting section 13 defines a series of packets having identical values in all the seven information items as "a flow" and statistically counts the numbers of packets and bytes for each flow. However, by adding the SNMP index number of an output interface to the definition (the seven information items) of a flow, it is possible to more closely and precisely grasp the state of traffic in the case where the destination IP address is identical but the output interface is different (in the case of policy routing, multipath, or the like). Likewise, by removing the destination IP address from the definition (the seven information items) of a flow, the statistics can be obtained in the form of integrating the destination IP address and hence it is possible to reduce the number of entries prepared on the flow statistic table 131 and also detect a terminal which transmits outstandingly large numbers of packets and bytes (a terminal suspected to launch DoS attack) at an early stage.

Further, as another modified embodiment, it is also acceptable that the flow statistics counting section 13, at the step 105, before the numbers of the relevant packets are added to the numbers of the packets and bytes of the entry A, computes the receive rate of the number of packets or bytes related to the relevant packets (the following expression (5) or (6)), and when the receive rate is larger than a predetermined threshold value, adds the numbers of the relevant packets, thereafter delivers the statistics and relevant information of the relevant entry to the flow statistics generating section 14, and transmits them to the collector. By so doing, it is possible for the collector to instantaneously detect a flow having outstandingly large numbers of packets and bytes (a flow suspected to be DoS attack) at an early stage. Note that the flow statistics counting section 13 erases the entry after it delivers the statistics and relevant information of the entry to the flow statistics generating section 14.

$$1/(\text{Present time}-\text{Flow reception finish time}) \geq \text{Threshold value} \quad (5),$$

$$\text{Byte number of packet}/(\text{Present time}-\text{Flow reception finish time}) \geq \text{Threshold value} \quad (6).$$

Here, the threshold values and predetermined times used in the aforementioned embodiments are independent from each other and can arbitrarily be changed by the administrator of a packet relay apparatus.

What is claimed is:

1. A packet relay apparatus which receives packets, searches for the routes thereof, and transmits them to the searched routes, said packet relay apparatus comprising:
a packet relay processing section to relay packets on the basis of a routing table;
a packet sampling section to sample the packets which said packet relay processing section has received;
a flow statistics counting section to identify each flow of the packets sampled by the packet sampling section, based on at least one of a source IP address, a destination IP address, a protocol number, a source port number and a destination port number therefor, which are included in the sampled packets; to tally, in a flow statistics table, the number of packets or bytes received per unit time for each flow on the identified flow basis therefor; and to output entries in said flow statistics table; and
a flow statistics generating section to receive each said entry in said flow statistics table output from said flow statistics counting section, and to transform the tallied number of packets or bytes received per unit time in each entry into a predetermined format,
wherein said flow statistics counting section extracts, from the flow statistics table, flows having a number of packets or bytes received per unit time that are less than a threshold level; accumulates the total number of the packets or bytes of all of said extracted flows; tallies the accumulated total number of the packets or bytes of all of said extracted flows as a single entry in said flow statistics table; and outputs said single entry as one of said entries output thereby.

2. The packet relay apparatus according to claim 1, wherein said flow statistics counting section tallies, as an entry in said flow statistics table, the number of the packets or bytes of each single flow received thereby per unit time for each single flow having the number of packets or bytes received per unit time that exceeds or is equal to the threshold value.

3. The packet relay apparatus according to claim 2, wherein said flow statistics generating section transforms flow information, which is tallied regarding each single flow by the flow statistics counting section, into the predetermined format and transmits the transformed flow information to a collector.

4. The packet relay apparatus according to claim 2, wherein said flow statistics generating section transforms flow information, which is tallied regarding each single flow by the flow statistics counting section, into the predetermined format and transmits the transformed flow information to a collector in cases as follows, for each single flow:
the idle time of the single flow exceeds a predetermined time;
the TCP connection of the single flow terminates; or
the holding time of the single flow exceeds a predetermined time.

5. The packet relay apparatus according to claim 1, wherein said flow statistics generating section transforms a flow statistic information of the accumulated total number tally performed by the flow statistics counting section, into the predetermined format and transmits the transformed flow statistic information to a collector.

6. The packet relay apparatus according to claim 1, wherein said flow statistics counting section monitors the number of the packets or bytes of flows received per unit time and outputs data notifying of an occurrence of an abnormality when said monitored number of the packets or bytes per unit time exceeds the threshold value.

7. An abnormal traffic detection method for detecting abnormal traffic, performed by a packet relay apparatus which receives packets, searches for the routes thereof, and transmits them to the searched routes, said method comprising the steps of:
sampling received packets by the packet relay apparatus;
identifying each flow of the sampled packets based on at least one of a source IP address, a destination IP address, a protocol number, a source port number and a destination port number, which are included in the sampled packets, by the packet relay apparatus;
tallying, in a flow statistics table, the number of packets or bytes received per unit time for each flow on the identified flow basis therefor, by the packet relay apparatus;
extracting, from the flow statistics table, flows having a number of packets or bytes received per unit time that are less than a threshold level, by the packet relay apparatus;
accumulating the total number of the packets or bytes of all of said extracted flows, collectively as other flows, by the packet relay apparatus; and
tallying the accumulated total number of the packets or bytes of all of said extracted flows as a single entry in said flow statistics table, by the packet relay apparatus.

8. The abnormal traffic detection method according to claim 7, further comprising the step of:
tallying, as an entry in the flow statistics table, the total number of the packets or bytes of each single flow having the number of the packets or bytes received per unit time that exceeds or is equal to the threshold value, by the packet relay apparatus.

9. The abnormal traffic detection method according to claim 8, further comprising the step of:
transmitting the tallied number of the packets or bytes of each single flow to a collector, by the packet relay apparatus.

10. The abnormal traffic detection method according to claim 7, further comprising the step of:
transmitting the tallied total number of the packets or bytes of the sampled flows to a collector, by the packet relay apparatus.

* * * * *

UNITED STATES PATENT AND TRADEMARK OFFICE
CERTIFICATE OF CORRECTION

PATENT NO. : 7,729,271 B2 Page 1 of 1
APPLICATION NO. : 11/365500
DATED : June 1, 2010
INVENTOR(S) : Tsuchiya et al.

It is certified that error appears in the above-identified patent and that said Letters Patent is hereby corrected as shown below:

On the cover sheet; Item (73) Assignee is corrected to

(73) Assignee: ~~Alaxala~~ ALAXALA Networks Corporation, Kawasaki (JP)

Signed and Sealed this

Third Day of August, 2010

David J. Kappos
*Director of the United States Patent and Trademark Office*